Patented July 16, 1940

2,208,105

UNITED STATES PATENT OFFICE 2,208,105

STABILIZATION OF LIGHT HYDROCARBON DISTILLATES

Robert B. Rathbun, Sunburst, Mont., assignor to The Texas Company, New York, N. Y., a corporation of Delaware No Drawing. Application August 28, 1937, Serial No. 161,415

4 Claims. (Cl. 44—9)

This invention relates to the stabilization of light hydrocarbon distillates such as gasoline and kerosene, to prevent deterioration and gum formation, by the addition of certain stabilizing agents. The invention has to do particularly with the stabilization of motor fuel comprising gasoline by the addition of certain reagents which are particularly effective for preventing discoloration and cloud formation resulting from exposure to sunlight.

Straight run gasolines and combined straight run and cracked gasolines have a tendency, when exposed to sunlight such as in visible pump bowls, to become cloudy and discolor and eventually deposit a heavy brown gum. This trouble is particularly acute in warm climates or in regions where the sunlight is particularly bright.

It has been found that the above difficulties in deterioration of gasolines in sunlight may be substantially overcome by incorporating in the gasoline a hydrocarbon of condensed aromatic ring nucleus, such as anthracene, and a phosphatide, such as lecithin. The following example will illustrate the effectiveness of such a combination of materials when added to straight run gasoline from Kevin-Sunburst or mixture of Kevin-Sunburst and Cut Bank crudes and exposed to sunlight.

| Stabilizer, lbs./1000 bbls. | Hours of sunlight to become cloudy |
|---|---|
| None | 2 |
| 5 lbs. anthracene | 4 |
| 5 lbs. anthracene+10 lbs. lecithin | 12 |
| 10 lbs. anthracene | 4 |
| 10 lbs. anthracene+10 lbs. lecithin | 18+ |

In stabilizing cracked gasoline or mixtures of straight run and cracked gasoline, it is often necessary or advantageous to use in addition to the mixture of anthracene and lecithin aromatic hydroxy or aromatic amino compounds, such as ortho cresol, dibutylamine, alphanaphthol, parabenzylaminophenol, pyrogallol, etc. With such treatment the gasoline is stabilized against both cloud formation and gum formation. The following specific data will illustrate the effect of such combinations on stabilizing gasoline containing cracked constituents.

| Stabilizer, percent by wt. and lbs./1000 bbls. | Hours in sunlight to become cloudy |
|---|---|
| 0.02% ortho cresol | 2 |
| 0.02% ortho cresol+15 lbs. anthracene | 3 |
| 0.02% ortho cresol+15 lbs. anthracene+5 lbs. lecithin | 8 |
| 0.02% ortho cresol+15 lbs. anthracene+10 lbs. lecithin | 16+ |

In the above example there is substantially no deterioration in gumming properties as determined by the oxygen bomb induction period and accelerated gum test, due to the addition of the ortho cresol.

The amount of stabilizers added may vary considerably but it is preferable to use not in excess of 15 pounds of anthracene per 1000 barrels and usually about 5 to 10 or 15 pounds per 1000 barrels is satisfactory. The amount of lecithin usually varies between about 5 to 15 pounds per 1000 barrels. The amount of the aromatic hydroxy or aromatic amine may vary between about 0.01 and 0.10% by weight.

Obviously many modifications and variations of the invention, as hereinbefore set forth, may be made without departing from the spirit and scope thereof and therefore only such limitations should be imposed as are indicated in the appended claims.

I claim:

1. A stable motor fuel comprising light color gasoline, normally unstable and tending to darken and to form a cloud in sunlight, stabilized by anthracene and lecithin, the amounts of anthracene and lecithin respectively not exceeding about 15 lbs. per 1000 barrels of motor fuel, whereby such darkening and cloud formation are substantially retarded.

2. A stable motor fuel comprising light color gasoline, normally unstable and tending to darken and to become cloudy in sunlight, stabilized by anthracene and lecithin, the amount of anthracene and lecithin respectively being about 5 to 10 lbs. per 1000 barrels of gasoline, whereby such darkening and cloud formation are substantially retarded.

3. A method of stabilizing a light color gasoline against darkening and cloud formation in sun light, which comprises adding to the gasoline anthracene and lecithin in sufficient amounts to substantially retard such darkening and cloud formation, said anthracene being present in an amount not in excess of about 15 pounds per 1000 barrels.

4. A method of stabilizing gasoline against darkening and cloud formation in sun light, which comprises adding to the gasoline anthracene and lecithin, each in the amounts of about 5 to 15 pounds per 1000 barrels, whereby such darkening and cloud formation are substantially retarded.

ROBERT B. RATHBUN.